United States Patent [19]

Calhoun et al.

[11] Patent Number: 4,526,135

[45] Date of Patent: Jul. 2, 1985

[54] EDDY CURRENT WORKPIECE POSITIONING APPARATUS

[75] Inventors: Gregory L. Calhoun, Allegheny Township, Allegheny County; Clark B. Candee, Edgewood, both of Pa.

[73] Assignee: Westinghouse Electric Corp., Pittsburgh, Pa.

[21] Appl. No.: 671,012

[22] Filed: Nov. 13, 1984

Related U.S. Application Data

[63] Continuation of Ser. No. 576,678, Feb. 3, 1984, abandoned.

[51] Int. Cl.³ .................... F22B 37/54; F28F 15/00; F28G 9/00
[52] U.S. Cl. .................... 122/382; 15/316 R; 122/392
[58] Field of Search ............... 122/379, 392, 390, 382; 15/316 R, 316 A

[56] References Cited

U.S. PATENT DOCUMENTS

| | | | |
|---|---|---|---|
| 3,831,561 | 8/1974 | Yamamoto et al. | 122/392 X |
| 4,273,076 | 6/1981 | Lahoda et al. | 122/382 |
| 4,276,856 | 7/1981 | Dent et al. | 122/382 |
| 4,355,536 | 10/1982 | McShane et al. | 73/633 |
| 4,424,769 | 1/1984 | Charamathieu et al. | 122/392 |
| 4,445,465 | 5/1984 | Byrd et al. | 122/382 X |
| 4,452,183 | 6/1984 | Yazidjian | 122/392 |

Primary Examiner—Edward G. Favors
Attorney, Agent, or Firm—Louis A. DePaul

[57] ABSTRACT

A sludge lance nozzle for removing sludge from between the tubes of a nuclear steam generator includes positioning apparatus mounted on top of the nozzle. The positioning apparatus includes a cylindrical eddy-current sensor mounted inside a cup-shaped non-magnetic electrically insulating spacer, which is in turn mounted in a cup-shaped support member fixedly secured to the nozzle. The tubes are arranged in rows and columns with the axes of the tubes in each column lying in a common column plane. The nozzle is moved perpendicular to the column planes close to one of the rows of tubes. The sensor produces a maximum-amplitude output signal when the sensing axis is coplanar with the column plane of a tube in the closest row of tubes and a minimum-amplitude output signal when the sensing axis is midway between adjacent tubes in the closest row of tubes.

18 Claims, 8 Drawing Figures

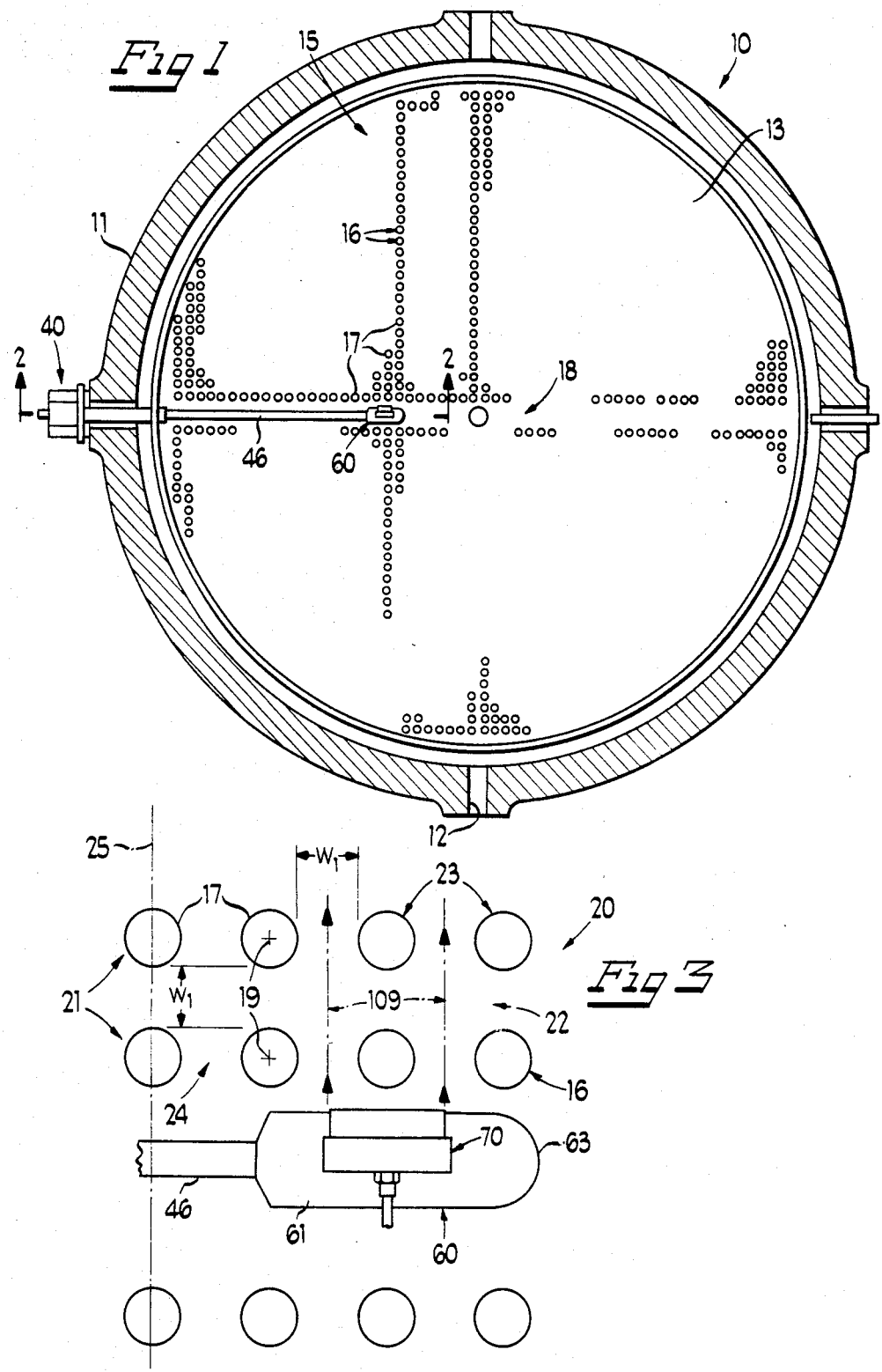

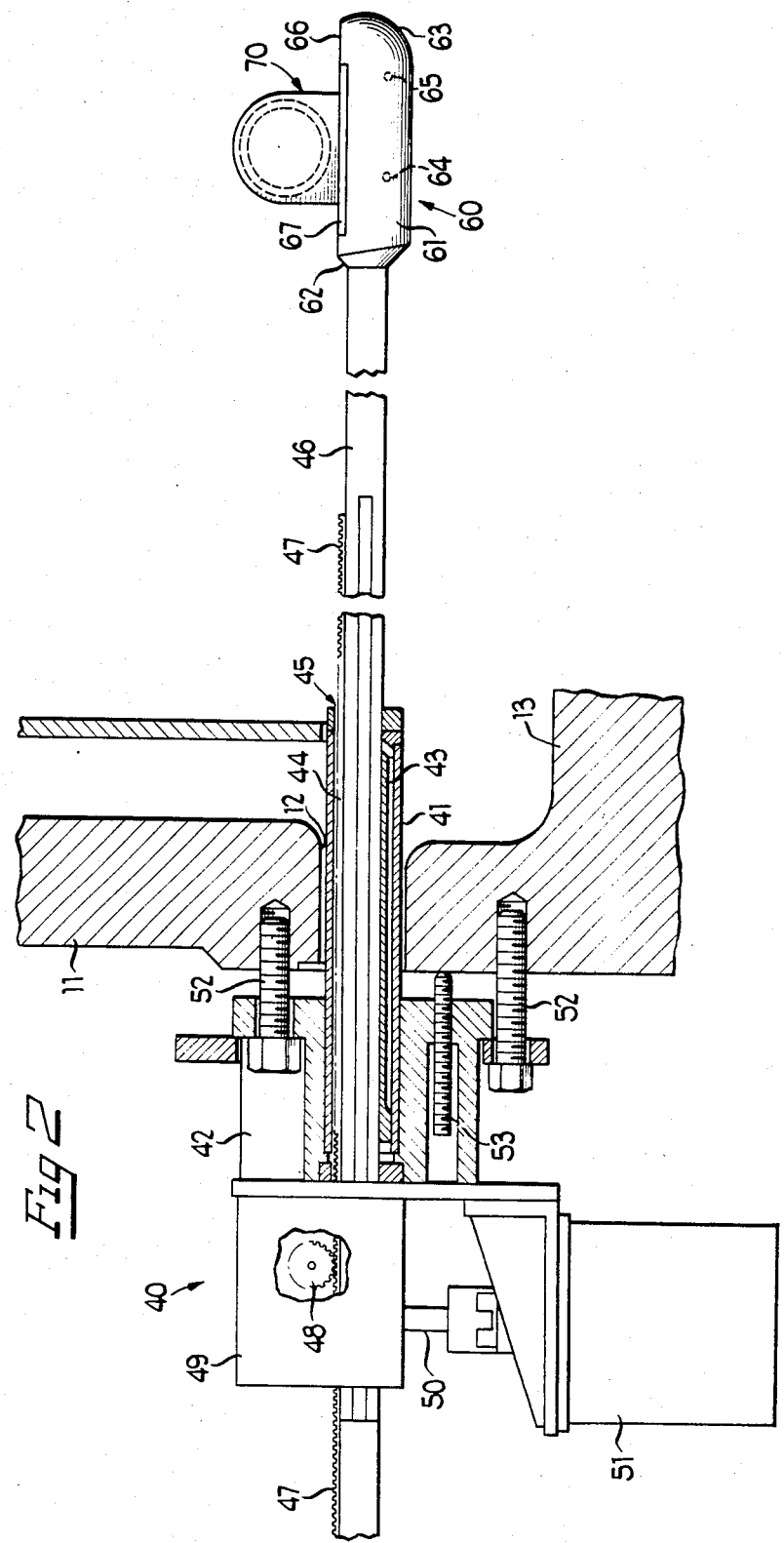

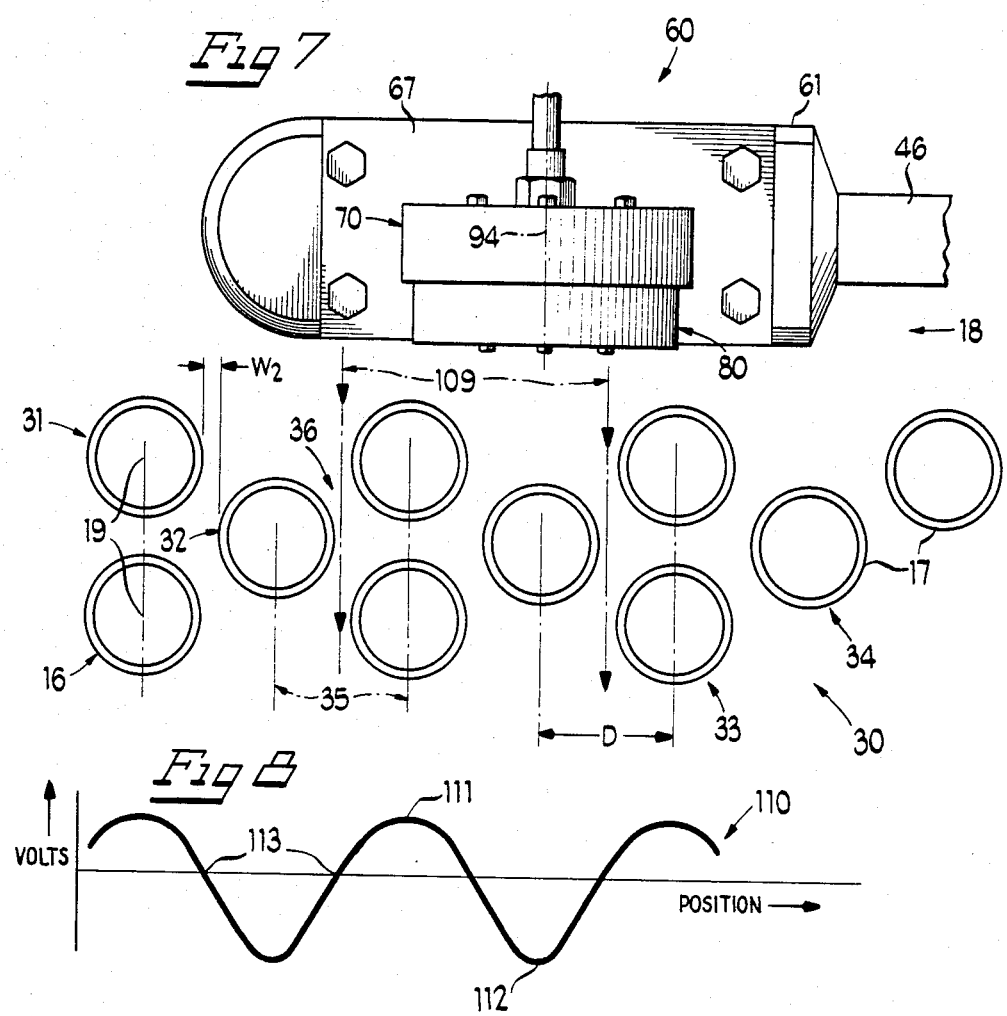

EDDY CURRENT WORKPIECE POSITIONING APPARATUS

BACKGROUND OF THE INVENTION

This application is a continuation of application Ser. No. 06/576,678, filed Feb. 3, 1984 now abandoned.

The present invention relates to a system for accurately positioning a workpiece with respect to an array of spaced-apart metal members. The invention has particular application to the maintenance of a nuclear steam generator, and specifically to the accurate positioning of a workpiece, such as a fluid lance nozzle, with respect to the heat-exchanger tubes of the steam generator.

A typical nuclear steam generator comprises a vertically oriented shell and a plurality of inverted U-shaped tubes disposed in the shell so as to form a tube bundle. Each tube has a pair of elongated vertical portions interconnected at the upper end by a curved bight portion, so that the vertical portions of each tube straddle a lane or passage through the tube bundle. The tubes are dimensioned and arranged so that, on each side of the tube lane or passage, the vertical tube portions are disposed in an array of parallel rows and parallel columns, with the rows and columns extending perpendicular to each other. The tubes may be arranged in a so-called "square pitch" array or in a so-called "triangular pitch" array. In a square pitch array the spacing between adjacent columns is the same as the spacing between adjacent rows, and each column contains a tube in every row which it intersects, and vice versa. In a triangular pitch array, the spacing between adjacent columns is different from the spacing between adjacent rows, and the array is staggered so that each column contains a tube in every other row which it intersects, and vice versa. In the triangular pitch array, the free space between adjacent columns is substantially less than in the square pitch array.

A tube sheet supports the vertical portions of the tubes at their lower ends. The vertical tube portions on one side of the tube lane are connected to a primary fluid inlet plenum and those on the other side of the tube lane are connected to a primary fluid outlet plenum. The primary fluid, having been heated by circulation through the reactor core, enters the steam generator through the primary fluid inlet plenum, is transmitted through the tube bundle and out the primary fluid outlet plenum. At the same time, a secondary fluid or feedwater is circulated around the tubes above the tube sheet in heat transfer relationship with the outside of the tubes, so that a portion of the feedwater is converted to steam which is then circulated through standard electrical generating equipment.

Sludge, mainly in the form of iron oxides and copper compounds along with traces of other metals, settle out of the feedwater onto the tube sheet. The sludge deposits provide a site for concentration of phosphate solution or other corrosive agents at the tube walls that results in tube thinning. Accordingly, the sludge must be periodically removed.

One known method for removal of the sludge is referred to as the sludge lance-suction method. Sludge lancing consists of using high pressure water to break up and slurry the sludge in conjunction with suction and filtration equipment that remove the water-sludge mixture for disposal or recirculation. A high velocity water lance is introduced through a handhole and moved along the tube lane adjacent to the tube sheet. The lance emits two high-velocity water jets perpendicular to the movement of the lance, i.e., parallel to the columns of tubes. The lance is stopped in predetermined positions so that the water jets are directed along the lanes or spaces between adjacent tube columns.

It is essential that the lance nozzle be accurately positioned so that the water jets are confined to the spaces between adjacent tube columns and do not directly strike the tubes, particularly the tubes in the row closest to the tube lane. This is not particularly difficult in a square pitch array, since the spacing between adjacent columns is relatively large. But in a triangular pitch array, the spacing between adjacent columns is very narrow, necessitating very accurate positioning of the lance nozzle. It is also desirable that this positioning be effected by remote control, so as to avoid man-rem exposure, which also necessitates very accurate positioning techniques.

SUMMARY OF THE INVENTION

It is a general object of the present invention to provide an improved workpiece positioning apparatus which avoids the disadvantages of prior apparatuses, while affording additional structural and operating advantages.

An important object of the invention is the provision of a workpiece positioning apparatus which affords highly accurate positioning of a workpiece from a remote location.

In connection with the foregoing object, it is another object of this invention to provide a workpiece positioning apparatus of the type set forth, wherein the positioning device may be mounted directly on the workpiece.

Another object of this invention is the provision of a workpiece positioning apparatus of the type set forth, which utilizes eddy current sensing techniques.

Still another object of this invention is the provision of an improved fluid lance nozzle which carries thereon a positioning apparatus of the type set forth.

These and other objects of the invention are attained by providing apparatus for accurately positioning a workpiece with respect to the vertical tubes of a nuclear steam generator wherein the tubes are disposed in an array of parallel rows and parallel columns, with the tubes in each column having their axes aligned in a common column plane and with a predetermined spacing between the tubes of adjacent columns, the apparatus comprising: transport means for moving the workpiece past the columns of tubes closely adjacent thereto in directions perpendicular to the column planes thereof, and eddy-current sensing means carried by the workpiece and having a sensing axis disposed parallel to the column planes, the sensing means generating an output signal which varies as a function of the distance between the sensing axis and the closest ones of the tubes.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a view in horizontal section through a nuclear steam generating vessel having tubes arranged in square pitch array, taken just above the tube sheet, and illustrating a fluid lance mounted in lancing position and incorporating a nozzle constructed in accordance with and embodying the features of the present invention;

FIG. 2 is an enlarged fragmentary view in vertical section taken along the line 2—2 in FIG. 1, with portions broken away more clearly to illustrate the construction;

FIG. 3 is an enlarged fragmentary view of a portion of FIG. 1, including the lance nozzle with outlet orifices arranged for use with a square pitch tube array;

FIG. 7 is a further enlarged view, similar to FIG. 3 but rotated 180°, and with the outlet orifices arranged for use with a triangular pitch tube array; and FIG. 8 is a wave form diagram plotting the sensor output voltage amplitude against the position of the nozzle as it moves along the tube lane.

DESCRIPTION OF THE PREFERRED EMBODIMENT

Figure 4:
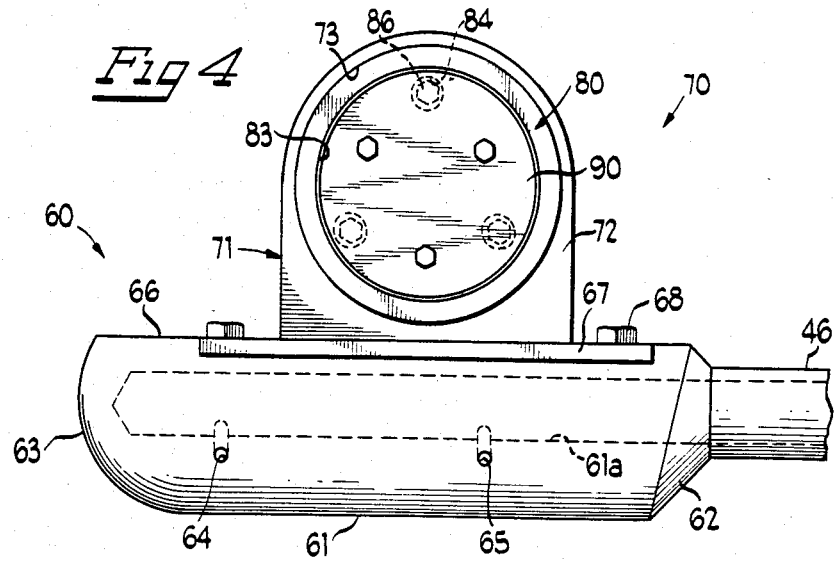
FIG. 4 is a further enlarged fragmentary front elevational view of the nozzle of FIG. 3, but with the outlet orifices arranged for use with a triangular pitch tube array.

Referring now to FIGS. 1 and 2 of the drawings, there is illustrated a nuclear steam generator vessel, generally designated by the numeral 10, which includes an elongated, generally cylindrical wall 11 provided with handholes or inspection ports 12 therethrough at equiangularly spaced-apart points around the circumference thereof. Extending across and closing the vessel 10 adjacent to the lower end thereof is a circular tube sheet 13 on which is mounted a tube bundle, generally designated by the numeral 15. The tube bundle 15 includes a plurality of heat transfer tubes 16 which may number about 7,000, and each of which is generally in the shape of an inverted U. Each tube 16 has a pair of vertical portions 17 which straddle a tube lane 18 extending diametrically across the tube sheet 13. The lower ends of each of the vertical portions 17 are inserted in complementary openings through the tube sheet 13 and communicate with inlet and outlet plenums (not shown) in the vessel 10 beneath the tube sheet 13, all in a well known manner.

Referring also to FIG. 3, each of the tubes 16 is substantially circular in transverse cross section, each of the vertical portions 17 having a longitudinal axis 19. The vertical tube portions 17 are arranged in what is commonly referred to as a "square pitch" array, generally designated by the numeral 20, comprising a plurality of parallel rows 21 equidistantly spaced apart by inter-row lanes or spaces 22, and a plurality of parallel columns 23, equidistantly spaced apart by intercolumn lanes or spaces 24, with the columns 23 extending perpendicular to the rows 21. The axes 19 of the vertical tube portions 17 in each column 23 lie in a common vertical column plane 25. In the square pitch array 20, each inter-column lane 24 has a width $W_1$ substantially equal to that of each inter-row lane 22. This width is typically in the range of from about 0.28 inch to about 0.40 inch.

Referring also to FIG. 7, there is illustrated another arrangement of the vertical tube portions 17 in what is commonly referred to as a "triangular pitch" array. In this array, the rows and columns of tubes are disposed in a staggered arrangement. More specifically, the vertical portions 17 of the tubes 16 are arranged in alternating rows 31 and 32 and alternating columns 33 and 34, such that each row 31 includes only tubes in the columns 33, while each row 32 includes only tubes in the columns 34. Adjacent tubes in each row 31 and 32 are spaced apart a distance greater than the diameter of each tube 16, with the tubes in each row 32 projecting into the spaces between the tubes in the adjacent row 31, and vice versa, so that the rows 31 and 32 overlap each other. Thus, the spacing between adjacent vertical tube portions 17 in each of the columns 33 and 34 may be substantially less than the diameter of each tube 16. The longitudinal axes 19 of the vertical tube portions 17 in each column 33 or 34 define a common vertical column plane 35. Each of the columns 33 is spaced from the adjacent columns 34 and vice versa by a distance $W_2$ which is substantially less than the diameter of each vertical tube portions 17, this distance typically being about 0.116 inch.

There is mounted on the nuclear steam generator vessel 10 a fluid lance, generally designated by the numeral 40, for the purpose of removing sludge which builds up on the tube sheet 13 between the columns and rows of tubes 16. The fluid lance 40 may be substantially like that disclosed in U.S. Pat. No. 4,273,076. The disclosure of that patent is incorporated herein by reference, so that only so much of the structure of the fluid lance 40 as is necessary for an understanding of the present invention need be described in detail herein.

The fluid lance 40 is mounted on the wall 11 adjacent to one of the handholes 12, as is best illustrated in FIG. 2, and includes an elongated tubular sleeve 41, which is extended through the handhole 12 coaxially therewith. The outer end of the tubular sleeve 41 is carried by a mounting plate 42 and has received therein a tubular member 43, which cooperates with the tubular sleeve 41 to form therebetween an annular chamber 44. This annular chamber 44 conducts a first fluid from outside the steam generator vessel 10 to the inside thereof near the tube sheet 13. The tubular sleeve 41 has two outlet openings (not shown) therein near the inner end thereof for emitting the first fluid from the first annular chamber 44 onto the tube sheet 13 so as to establish a peripheral flow on the tube sheet 13 and around the outside of the tube bundle 15.

The fluid lance 40 also includes an elongated tubular member 46 which is slidably disposed within the tubular member 43 and has a rack 47 disposed on the top portion thereof. The rack 47 is disposed for meshing engagement with a gear 48 mounted in a gear box 49 carried by the mounting plate 42. The gear 48 is also coupled through a suitable gear train to a drive line 50, which is in turn coupled to the output shaft of a stepping motor 51 carried by the mounting plate 42. The mounting plate 42 is secured by bolts 52 to the wall 11 of the steam generator vessel 10 in a manner to support the fluid lance 40 while it is disposed through the handhole 12. The mounting plate 42 also has holes therein for accommodating jack screws 3, which are provided for aligning the mounting plate 42 with respect to the wall 11 and the handhole 12.

In operation, it will be appreciated that the stepping motor 51 is operated for inserting the tubular member 46 into and withdrawing it from the steam generator vessel 10, it being appreciated that the handhole 12 in which the fluid lance 40 is mounted is aligned with the tube lane 18 so that the tubular member 46 travels along the tube lane 18 parallel to the rows 31 and 32 of the vertical tube portions 17.

Figure 5:
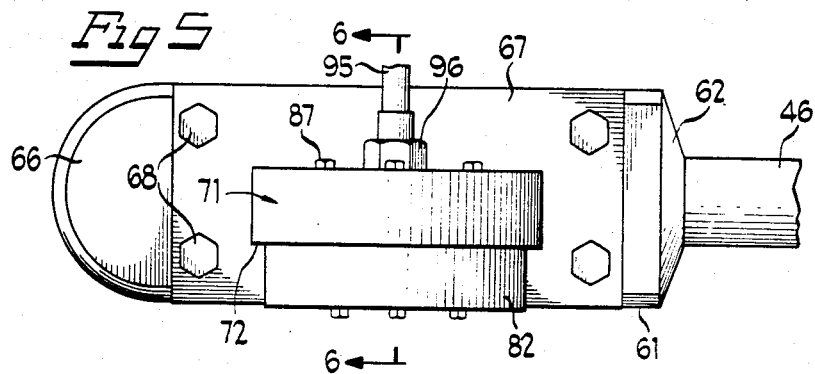
FIG. 5 is a top plan view of the nozzle illustrated in FIG. 4.
Figure 6:
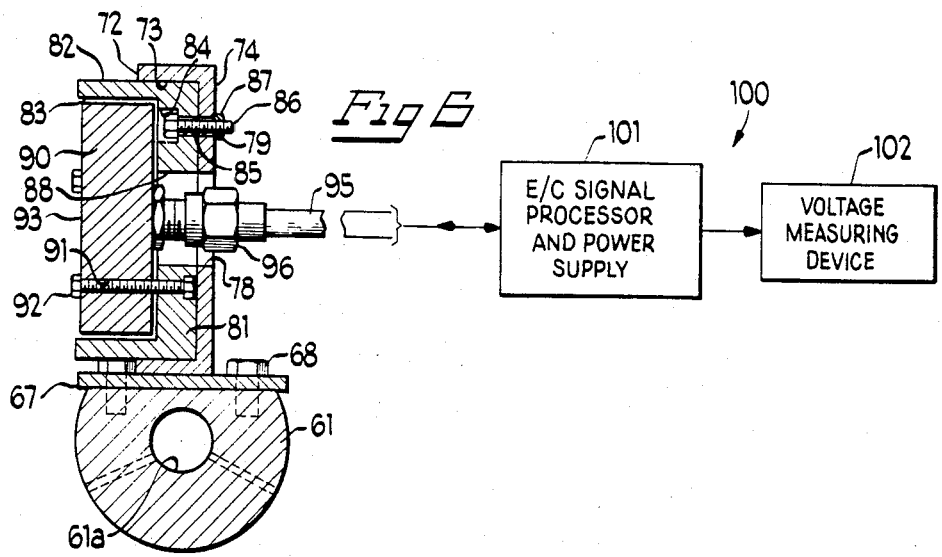
FIG. 6 is a view in vertical section taken along the line 6—6 in FIG. 5 and illustrating connection of the sensor to associated control circuitry.

Referring now also to FIGS. 4–6 of the drawings, a nozzle, generally designated by the numeral 60, is mounted on the inner end of the tubular member 46. The nozzle 60 includes a tubular body 61 having a passage 61a extending longitudinally thereinto, the tubular body 61 being mounted so that the passage 61a is arranged coaxially with the tubular member 46 and in communication with the interior thereof. The tubular body 61 has a generally frustoconical portion 62 connected to the tubular member 46 and has a part-spherical distal end 63. Formed in the side wall of the tubular member 61 and communicating with the passage 61a are two longitudinally spaced-apart outlet orifices 64 and 65 arranged with the axes thereof disposed substantially horizontally and parallel to each other. The tubular body 61 has a flattened top portion 66 on which is mounted a positioning apparatus, generally designated by the numeral 70.

The positioning apparatus 70 includes a flat mounting plate 67 disposed on the flattened top portion 66 of the nozzle 60 and secured in place by suitable fasteners, such as bolts 68. Mounted on the mounting plate 67 is a support block, generally designated by the numeral 71, which is fixedly secured to the mounting plate 67, as be welding, and extends vertically upwardly therefrom. The support block 71 has a generally rectangular lower end and a substantially semicircular upper end. The front face 72 of the support block 71 lies in a substantially vertical plane and has formed therein a circular recess 73 disposed coaxially with the semicircular upper end of the support block 71. The circular recess 73 has a depth substantially greater than half the thickness of the support block 71 and forms a relatively thin circular rear wall 74. The rear wall 74 has a circular bore 78 therethrough centrally thereof (FIG. 6), and three equiangularly spaced apart bolt holes 79 spaced radially outwardly from the bore 78.

Seated in the circular recess 73 in the support block 71 is a generally cup-shaped circular spacer 80 which has a circular end wall 81 integral around the perimeter thereof with a peripheral side wall 82 which has a cylindrical outer surface with a diameter very slightly less than the diameter of the recess 73 to permit nesting therein in a mounted configuration with the end wall 81 disposed in engagement with the rear wall 74 of the support block 71, as is best illustrated in FIG. 6. The peripheral wall 82 is dimensioned so that in this mounted configuration it extends forwardly well beyond the front face 72 of the support block 71.

Formed in the end wall 81 are three circular sockets 84 respectively communicating with cylindrical bores 85 extending through the end wall 81 and respectively disposed for alignment with the bolt holes 79 in the rear wall 74 of the support block 71 for accommodating bolts 86 with the heads thereof respectively seated in the sockets 84. The bolts 86 project rearwardly through the rear wall 74 and are held in place by associated nuts 87 securely to mount the spacer 80 in place. The end wall 81 is also provided with a central circular bore 88 therethrough congruent with the bore 78 in the rear wall 74 of the support block 71.

Nested coaxially within the spacer 80 is a circularly cylindrical eddy current sensor unit 90, having a thickness such that it is completely receivable within the spacer 80. Extending through the sensor units 90 are three bolt holes 91 which are equiangularly spaced apart and are respectively alignable with complementary bores through the spacer end wall 81 to accommodate mounting bolts 92 engageable with complementary bolts for securely mounting the sensor unit 90 in place in the spacer 80. When thus mounted in place, the front face 93 of the sensor unit 90 is disposed in a vertical plane arranged substantially perpendicular to the vertical column planes 25 or 35 of the tube bundle 15. Preferably, the front face 93 of the sensor unit 90 is spaced a relatively short distance from the closest row 31 of vertical tube portions 17, this distance preferably being less than 0.7 inch. The central axis of the sensor unit 90 defines a sensing axis 94 (see FIG. 7) which extends horizontally substantially parallel to the column planes 25 or 35 of the tube bundle 15.

The sensor unit 90 is an eddy current type of displacement measurement instrument. The spacer 80 is formed of a non-magnetic and electrically insulating material, such as nylon or other suitable plastic material. The bolts 92 and associated nuts holding the sensor unit 90 in place are also formed of a suitable non-magnetic and electrically insulating plastic material.

A control cable 95 is coupled to the rear end of the sensor unit 90 centrally thereof by a suitable coupling 96 which extends through the central bores 78 and 88 in the rear wall 74 and the spacer end wall 81, respectively. Referring in particular to FIG. 6, the cable 95 may be coupled to a control unit 100 which includes an eddy current signal processor and power supply 101 and a suitable voltage measuring device 102.

The nozzle 60 operates in the usual manner, the relationship between the size of the outlet orifices 64 and 65 and the volume of fluid flow through the nozzle 60 being such that very high-velocity jets 109 of fluid are emitted from the outlet orifices 64 and 65, as indicated by the arrows in FIGS. 3 and 7.

It will be noted that the positioning apparatus 70 can be mounted and demounted as a unit on the nozzle 60. It is advantageous to provide different types of nozzles 60 for different types of tube bundle configurations, in which case the sensor assembly can be readily mounted and demounted with respect to whatever particular type of nozzle is to be used. Similarly, it will be appreciated that, while only two outlet orifices 64 and 65 have been illustrated in the nozzle 60, any desired number of outlet orifices could be provided, as long as they are equidistantly spaced apart longitudinally of the nozzle 60.

When the nozzle 60 is to be used with a square pitch tube array 20 (see FIG. 3), the spacing between the axes of adjacent outlet orifices is preferably equal to the spacing between adjacent column planes 25, with the outlet orifice axes being respectively disposed on opposite sides of the sensing axis 94 and equidistantly spaced therefrom.

When the nozzle 60 is to be used with a triangular pitch tube array 30 (see FIG. 7), the outlet orifices are again arranged with at least one on each side of the sensing axis 94, the spacing between adjacent outlet orifice axes being defined by the relationship 2ND, where N is a positive integer and D is the distance between adjacent column planes 35. In this case, each outlet orifice axis is spaced from the sensing axis 94 by a distance S, such that $S=(2N-1)D/2$. From the foregoing relationships, it can be seen that whenever the sensing axis 94 is disposed in one of the column planes 25 or 35, each outlet orifice will be aligned with the center of one of the inter-column lanes 24 or 36.

Referring now to FIG. 8, the operation of the nozzle 60 and the positioning apparatus 70 will be described in detail. The eddy current signal processor and power supply 101 provides an electrical current to a coil in the sensor unit 90, setting up a magnetic field in a known manner. This field is utilized to induce a current in the vertical tube portions 17, which current is dependent on the distance of the vertical tube portions 17 from the sensor unit 90. The induced current in each vertical tube portion 17 establishes its own magnetic field, and this induced magnetic field in turn induces a change in the current in the coil of the sensor unit 90. This change in current is measured by a Wheatstone bridge in the eddy current processor and power supply 101 which produces a voltage output signal which is measured and displayed by the voltage measuring device 102.

The amplitude of this voltage output signal is inversely proportional to the distance between the sensor unit 90 and the vertical tube portions 17. Thus, as the nozzle 60 is continuously moved longitudinally of the tube lane 18, the output voltage applied to the voltage measuring device 102 will be a generally sinusoidal wave form. When the nozzle 60 is used in a square pitch array 20 of the vertical portions 17, the output voltage wave form will be a substantially perfect sinusoid. The case of the triangular pitch array 30, however, is somewhat more complex.

The output voltage 110 produced by movement of the nozzle 60 along the tube lane 18 in a triangular pitch array is illustrated in FIG. 8, which is arranged on the same position scale as FIG. 7. From FIG. 7, it can be seen that the closest row of vertical tube portions 17 to the sensor unit 90 is a row 31, comprised only of vertical tube portions 17 in the columns 33. The second row 32 has the vertical tube portions 17 thereof staggered between the vertical tube portions 17 of the row 31. Because of this staggered arrangement, the sensor unit 90 will, at any given moment, directly face vertical tube portions of both the front row 31 and the second row 32 and will, therefore, induce currents in the vertical tube portions of both of those rows. It follows that the change in current in the sensor unit 90 will be caused by a combination of the effects of the magnetic fields induced in the vertical tube portions 17 of both of the rows 31 and 32.

Preferably, the sensor unit 90 is calibrated so that when the sensing axis 94 is coplanar with a column plane 35 of a column 33, which includes one of the vertical tube portions 17 in the front row 31, the output voltage will have a maximum amplitude 111, while when the sensing axis 94 is coplanar with the column plane 35 of one of the columns 34, the first vertical tube portion 17 of which is in the second row 32, the output voltage will have a minimum amplitude 112.

It will be noted that the peaks of the voltage wave form 110 are broader than the valleys. This is because the vertical tube portions 17 in the front row 31 have a dominant effect on the output voltage over a majority of each cycle of the output voltage wave form 110. More specifically, as the sensing axis 94 moves from the column plane of a column 33 to that of an adjacent column 34, the center of the front face 93 of the sensor unit 90 will, for most of this distance, be closer to the vertical tube portion 17 in the front row 31 than to that in the second row 32.

Because the maximum and minimum amplitude values 111 and 112 of the output voltage wave form 110 are precalibrated, it will be understood that there is provided a method for accurately determining the position of the sensor unit 90 and, therefore, the nozzle 60, along the tube lane 18. More specifically, when the maximum voltage amplitude 111 is detected, it indicates that the sensing axis 94 is aligned coplanar with the column planar 35 of one of the columns 33, and when the minimum amplitude value 112 of the output voltage is detected, this indicates that the sensing axis 94 is aligned coplanar with the column plane 35 of one of the columns 34. Because of the geometry of the nozzle 60, described above, in either of these maximum or minimum voltage conditions, the axes of the outlet orifices 64 and 65 will be accurately aligned with the centers of the inter-column lanes 36 so that the jets of water 109 emitted therefrom will pass along these inter-column lanes 36 and not impinge directly on any one of the vertical tube portions 17.

This accurate positioning is extremely important in the case of the triangular pitch array 30, because the very narrow width (approximately 0.116 inch) of the inter-column lanes 36 leaves very little room for error. Thus, in operation, the nozzle 60 will be stopped in one of these positions of maximum amplitude or minimum amplitude output voltage and the fluid lance 40 will be operated for a period of time in that position to remove the sludge from the associated inter-column lanes 36.

The operation of the positioning assembly 70 in the case of a square-pitch tube array 20 is similar, except that in that case the positioning is less critical because of the relatively large width $W_1$ of the inter-column lanes 24. In this arrangement, the front face 93 of the sensor unit 90 will directly face only vertical tube portions 17 in the front row 21. Therefore, the output voltage wave form will have maximum amplitude when the sensing axis 94 is aligned coplanar with the column plane 25 of one of the columns 23 and will have a minimum-amplitude value when the sensing axis 94 is disposed midway between two adjacent column planes 25. However, the nozzle outlet orifces 64 and 65 are arranged so as to be positioned in a lancing position alligned centrally of one of the inter-column lanes 24 when the sensor unit 90 is disposed in its maximum-amplitude output voltage position. This is because the maximum-amplitude level is more unambiguously identifiable than is the minimum-amplitude level.

While in the disclosed embodiment, the positioning apparatus 70 has been illustrated in use for positioning the nozzle 60 of the fluid lance 40, it will be appreciated that it could be used for positioning any type of workpiece movable along the tube lane 18. Any such alternative type of workpiece could be adapted to have the positioning apparatus 70 mounted directly thereon in the same manner as it is mounted on the nozzle 60. It will also be appreciated that the positioning apparatus 70 is uniquely adapted for automatic and remote-control operation. More particularly, when coupled with a computer progra including a stored map of the tube array, the positioning apparatus 70 ca be utilized as an indicator of absolute position within the nuclear steam generator vessel 10.

From the foregoing, it can be seen that there has been provided an improved positioning apparatus for accurately positioning a fluid lance nozzle or other workpiece with respect to the vertical portions of the tubes of a nuclear steam generator, regardless of whether the tubes are arranged in square pitch or triangular pitch array, the apparatus providing extremely accurate positioning with the use of existing eddy-current sensing techniques.

We claim:

1. Apparatus for accurately determining position with respect to the vertical tubes of a nuclear steam generator wherein the tubes are disposed in an array of parallel rows and parallel columns, with the tubes in each column having their axes aligned in a common column plane and with a predetermined spacing between the tubes of adjacent columns, said apparatus comprising: a fluid lance nozzle having a fluid outlet orifice, transport means for moving said nozzle past the columns of tubes closely adjcent thereto in directions perpendicular to the column planes thereof, said orifice being disposed for discharging a stream of fluid parallel to the column planes, and eddy-current sensing means carried by said nozzle and having a sensing axis disposed parallel to the column planes, said sensing means being responsive to disposition of said sensing axis in a lancing position coplanar with one of the column planes for generating a predetermined output signal level, said orifice being disposed so that the fluid stream therefrom will pass between adjacent columns when said sensing axis is disposed in the lancing position thereof.

2. The apparatus of claim 1, wherein said sensing means is circularly cylindrical in shape with said sensing axis being the axis of the cylinder.

3. The apparatus of claim 1, and further including mounting means fixedly mounting said sensing means on the workpiece.

4. The apparatus of claim 1, wherein said sensing means is mounted on top of the workpiece.

5. The apparatus of claim 1, and further including control means coupled to said sensing means for providing operating power thereto and for receiving and displaying output signals therefrom.

6. The apparatus of claim 1, wherein said transport means moves said sensing means in a path alongside and parallel to the closest row of tubes, said output signal varying between a maximum amplitude when said sensing axis is coplanar with the column plane of one of the tubes in said closest row of tubes and a minimum amplitude when said sensing axis is midway between the column planes of two adjacent tubes in said closest row of tubes.

7. The apparatus of claim 6, wherein said output signal resulting from continuous movement of said sensing means along said path is a substantially sinusoidal signal.

8. The apparatus of claim 1, wherein said nozzle includes plural outlet orifices.

9. The apparatus of claim 8, wherein at least two of said orifices are respectively disposed on opposite sides of said sensing axis and discharge streams of fluid parallel to said axis and in the same direction.

10. The apparatus of claim 9, wherein said sensing axis lies in a sensing plane parallel to said column planes, one of said two nozzles being spaced from said sensing plane one-half the distance between the column planes of adjacent tubes in the closest row of tubes and the other of said two nozzles being spaced from said sensing plane a distance equal to an integral number of times the distance between the column planes of adjacent tubes in the closest row of tubes.

11. A fluid lance nozzle adapted to be moved among and accurately positioned with respect to the vertical tubes of a nuclear steam generator wherein the tubes are disposed in an array of parallel rows and parallel columns, with the tubes in each column having their axes aligned in a common column plane and with a predetermined spacing between the tubes of adjacent columns, said nozzle comprising: a tubular body having a fluid outlet orifice disposed for discharging a stream of fluid parallel to the column planes, a mounting plate carried by said body, a support bracket mounted on said mounting plate, an eddy-current sensor having a sensing axis, said sensor being supported by said support bracket in a mounted position with said sensing axis disposed parallel to the column planes, said sensor being responsive to disposition of said sensing axis in a lancing position coplanar with one of the column planes for generating a predetermined output signal level, said orifice being disposed so that the fluid stream therefrom will pass between adjacent columns when said sensing axis is disposed in the lancing position thereof.

12. The nozzle of claim 11, wherein said tubular body has a flattened portion thereon to which said mounting plate is attached.

13. The nozzle of claim 11, wherein said sensor is mounted on top of said tubular body.

14. The nozzle of claim 11, and further including spacer means of a non-magnetic electrically insulating material disposed between said sensor and said support bracket.

15. The nozzle of claim 11, wherein said support bracket comprises a generally cup-shaped member with a circularly cylindrical side wall having the axis thereof disposed at said sensing axis, said sensor being circularly cylindrical in shape and receivable in said support bracket coaxially therewith.

16. The nozzle of claim 15, and further including a generally cup-shaped spacer with a circularly cylindrical side wall disposed between said sensor and said support bracket in nested relationship therewith.

17. The nozzle of claim 16, wherein said sensor is fixedly secured to said spacer and said spacer is fixedly secured to said support bracket.

18. The nozzle of claim 11, wherein said tubular body has two fluid outlet orifices respectively disposed on opposite sides of said sensing axis and respectively discharging streams of fluid parallel to said sensing axis and in the same direction.

* * * * *